United States Patent [19]

Fringer

[11] Patent Number: 5,159,759
[45] Date of Patent: Nov. 3, 1992

[54] DEBRIS SHIELD FOR A HAND HELD POWER SAW

[76] Inventor: Daniel L. Fringer, P.O. Box 171, Nolensville, Tenn. 37135

[21] Appl. No.: 721,170

[22] Filed: Jun. 26, 1991

[51] Int. Cl.⁵ .............................................. B23D 45/16
[52] U.S. Cl. ........................................ 30/390; 30/514
[58] Field of Search ............... 30/390, 514, 516, 124, 30/128, 391; 83/98, 100, 478, 860, 544

[56] References Cited

U.S. PATENT DOCUMENTS

| | | | |
|---|---|---|---|
| 1,525,723 | 2/1925 | Davis | 30/390 |
| 3,513,888 | 5/1970 | Townsend et al. | 30/390 |
| 3,662,796 | 5/1972 | Batistelli | 30/390 |
| 3,727,655 | 4/1973 | Garcher | 30/514 |
| 4,414,743 | 11/1983 | Pioch et al. | 30/390 |
| 4,466,187 | 8/1984 | Morimoto | 30/390 |
| 4,675,999 | 6/1989 | Ito et al. | 30/390 |
| 4,856,394 | 8/1989 | Clowers | 30/390 |
| 5,007,173 | 4/1991 | Rush | 30/391 |
| 5,033,192 | 7/1991 | Franz et al. | 30/390 |
| 5,046,255 | 9/1991 | Lebreux | 30/286 |

*Primary Examiner*—Douglas D. Watts
*Assistant Examiner*—Hwei-Siu Payer
*Attorney, Agent, or Firm*—Edward D. Lanquist, Jr.; Mark J. Patterson

[57] ABSTRACT

The present invention discloses a shield that attaches to the upper guard of a hand held power saw. The shield prevents debris created by operation of the saw from hitting the user. The rotation of the saw blade creates moving air. The shield directs the moving air away from the saw and the user. The shield in translucent and can be made from polycarbonate.

5 Claims, 3 Drawing Sheets

DEBRIS SHIELD FOR A HAND HELD POWER SAW

BACKGROUND OF THE INVENTION

The present invention relates generally to a safety device for a saw and more specifically to a device for protecting a user of a hand held hand power saw from debris ejected from the saw during use.

It will be appreciated by those skilled in the art that hand power saws are widely used to cut wood. It will be further appreciated by those skilled in the art that, when a hand power saw is in use, debris is forced back toward the user because of the rotation of the blade. This flying debris can be as small as wood shavings or as large as wood chips or wood blocks. This debris poses at least a nuisance and can pose a hazard to the user. The rotation of the saw blade increases the nuisance by creating turbulence which blows debris toward the user. To this end, there have been several attempts to provide a device for protecting a user against flying debris while using a hand power saw.

One such attempt can be found on almost any hand power saw. Early hand power saws had an exposed blade. Modern hand power saws have an upper guard as is shown in FIGS. 1-3 of the drawings herein showing a standard hand held power tool. This offers a degree of protection from flying debris. Unfortunately, this upper guard is very narrow and cannot block much of the flying debris.

What is needed, then, is a device for protecting a user of a hand held power saw from flying debris. This device must be easily attachable to a standard hand power saw. This device must be transparent and at least translucent, to enable the user to see the work piece that is being cut. This device must be made of a flexible material. This device must redirect the turbulence created by the moving saw blade of a hand held power tool. This device is presently lacking in the prior art.

SUMMARY OF THE INVENTION

In the present device, a debris shield is attached to the upper guard of a standard hand held hand power saw with snaps, pop rivets, screws, and the like. This shield extends away from the motor. The rotation of the hand power saw within the semi-enclosed area causes a wind tunnel effect which forces all debris away from the blade and away from the user. The debris shield can also include a fan shield that is placed over the cooling fan of the saw which adds to the wind tunnel effect to force the debris away from the user.

Accordingly, one object of the present invention is to provide a device for protecting the user of a hand held power saw from flying debris.

Still another object of the present invention is to provide a device that is easily attachable to a standard hand held power saw.

Still another object of the present invention is to provide a device that is transparent or at least translucent and allows the user to see the work piece upon which the saw is cutting.

Another object of the present invention is to provide a device which is flexible, so that it can be adhered to different types of hand held power saws.

DESCRIPTION OF THE PREFERRED EMBODIMENT

Figure 1A:
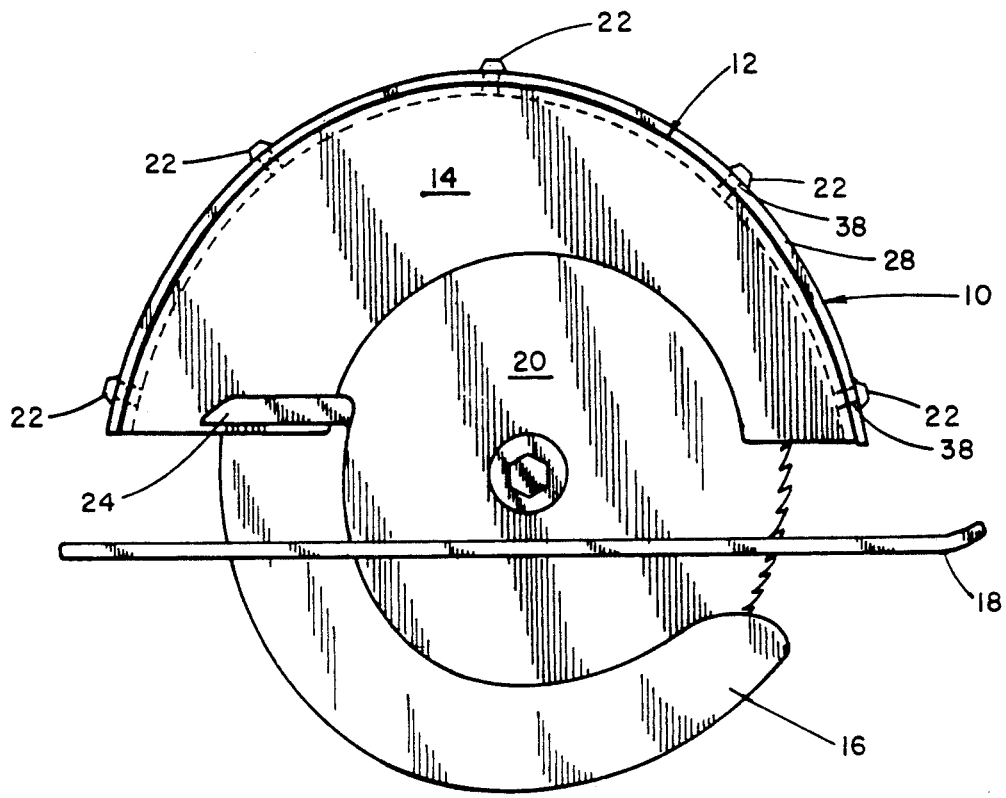
FIG. 1a is a side view of the device for protecting the user from flying debris as it attaches to a standard hand held power saw.
Figure 1B:
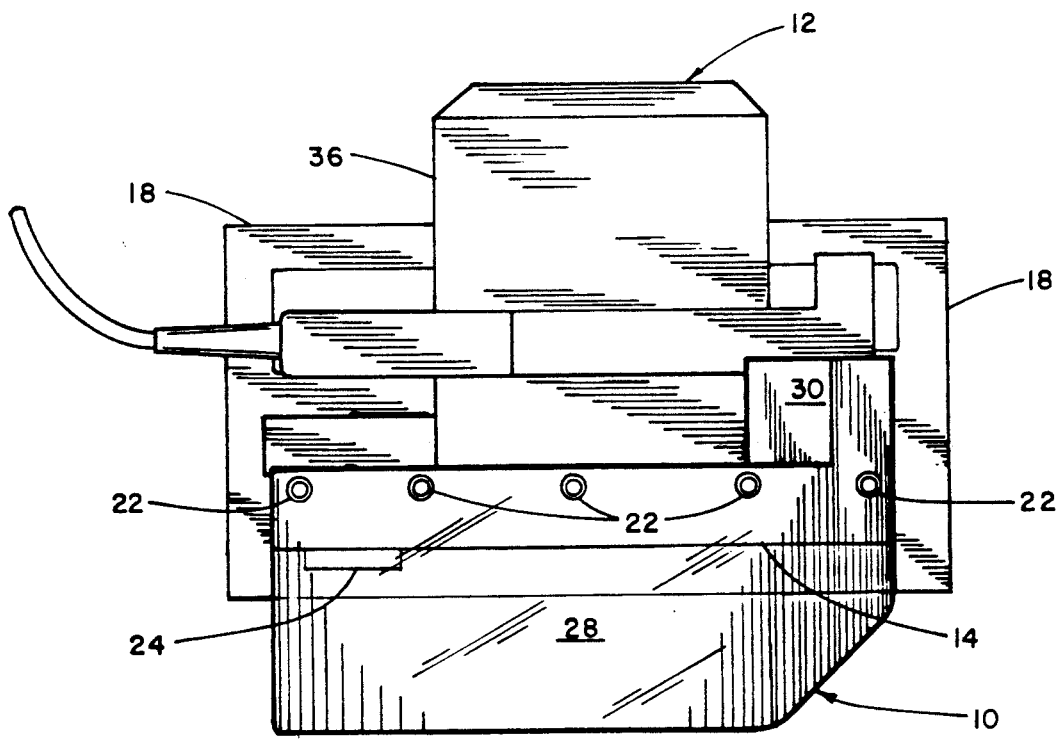
FIG. 1b is a top view of the device for protecting the user from flying debris as it attaches to a standard hand held power saw.
Figure 1C:
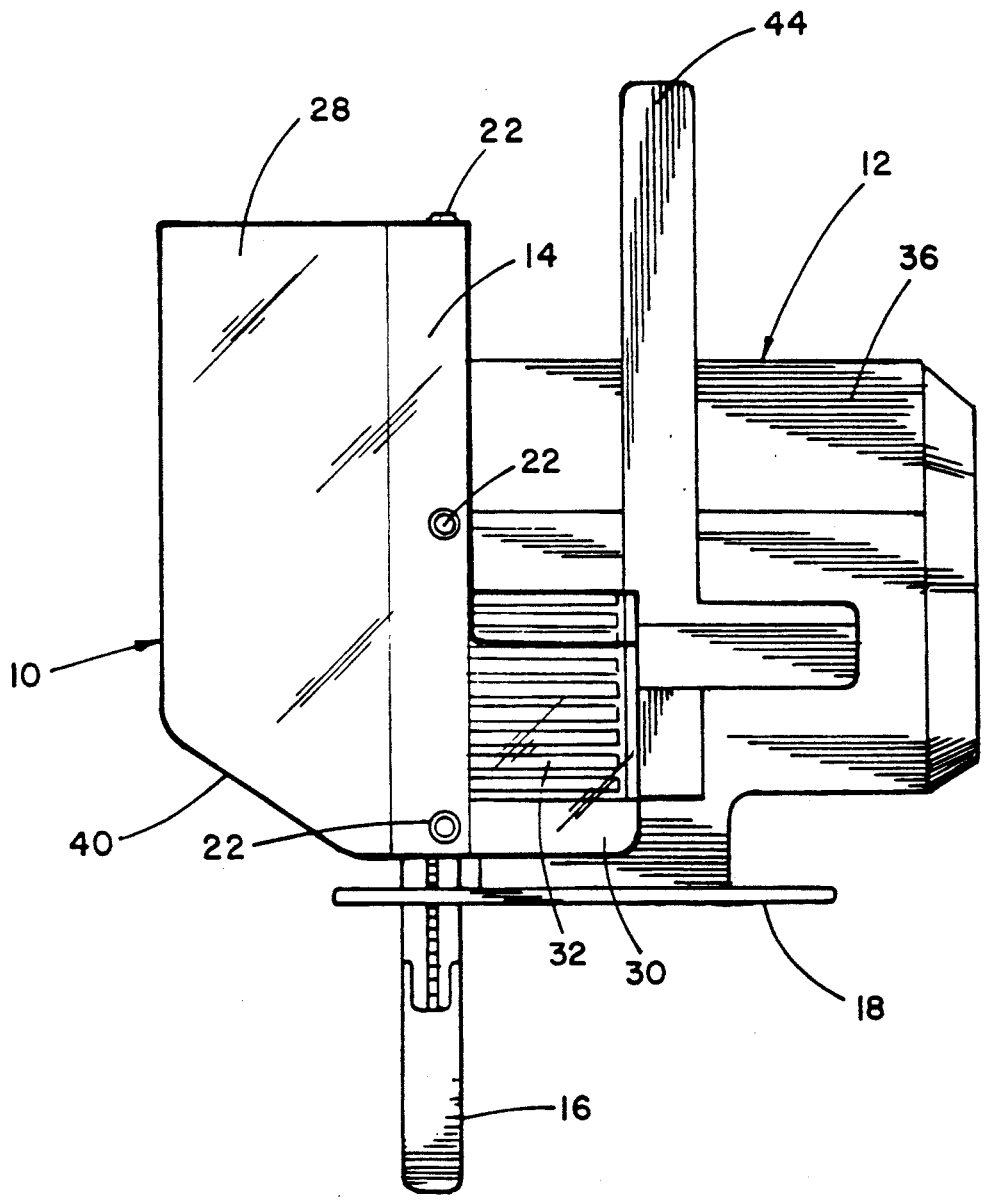
FIG. 1c is a front view of the device for protecting the user from flying debris as it attaches to a standard hand held power saw.

Referring now to FIGS. 1a-c, there is shown generally at 10 the protective shield of the present invention. Shield 10, which includes blade shield 28 and fan shield 30, attaches to a standard hand held power saw 12 having an upper guard 14. In some designs, saw 12 will have a lower guard 16. Some lower guards 16 have blade guard handle 24 which allows the user to rotate the lower guard so that it does not interfere with the work piece being sawed. Guards 14, 16 almost entirely encircle blade 20. Guide 18 controls the movement of the hand held power saw 12 on the work piece. Blade shield 28 has snap holes (26 in FIG. 3) which receive snaps 22. In some tools, saw 12 will require holes 38 placed in upper guard 14 to align with snap holes (26 in FIG. 3). In either case, blade shield extends laterally from upper guard 14 and is shaped to substantially conform to the curvature of guard 14 and blade 20.

Snaps 22 penetrate snap holes (26 in FIG. 3) and holes 38 in upper guard 14. In certain instances, blade guard handle 24 may have to be extended so that it extends out from under blade shield 28 so that the user can easily access blade guard handle 24 to move lower guard 16.

Although snaps 22 are used in the preferred embodiment, any type of fixed or releasable attachment can be used, such as pop rivets, screws, bolts, glue, and the like.

Rotation of blade 20 by motor 36 directs air into blade shield 28 which causes a wind tunnel effect that forces debris away from blade 20 in a direction away from motor 36. Debris shield 10 includes fan shield 30 which extends laterally from the forward, lower edge of blade shield 28, and covers fan 32 to enhance the wind tunnel effect and to prevent debris from entering fan 32. As can be seen from FIG. 1c, a user holding saw 12 at handle 44 would not be effected by debris forced away from saw 12 by the wind tunnel effect caused by blade shield 28.

Figure 2:
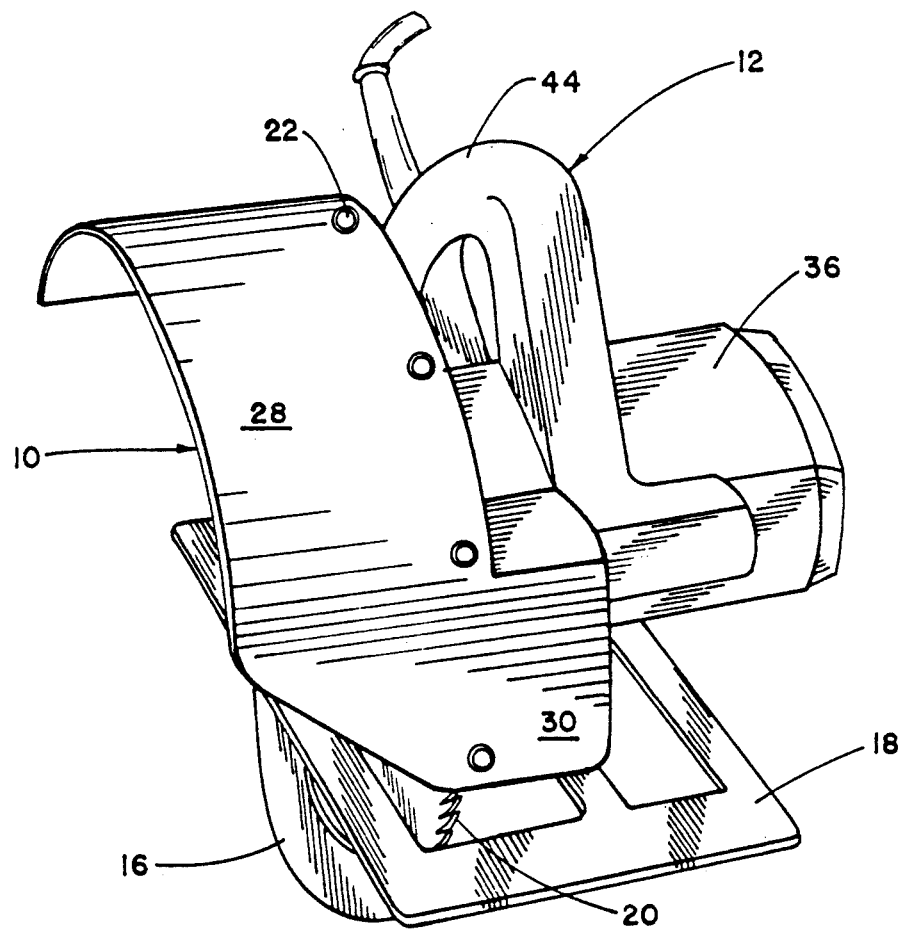
FIG. 2 is a perspective view of the device for protecting the user from flying debris as it attaches to a standard hand held power saw.

Referring now to FIG. 2, there is shown generally at 10 the debris shield attached to saw 12. In order to improve the wind tunnel effect, blade shield 28 extends substantially 3 or more inches away from upper guard 14. However, the distance is not crucial as long as turbulence from the rotation of blade 20 is directed away from blade 20.

Figure 3:
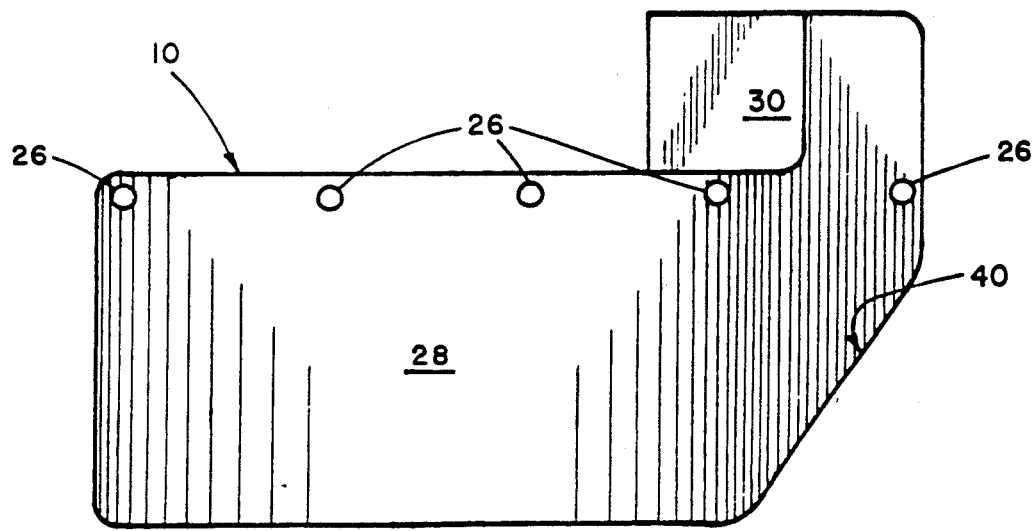
FIG. 3 is a plan view of the debris shield of the present invention.

Referring now to FIG. 3, there is shown generally at 10 the shield of the present invention. Shield 10 includes blade shield 28, fan shield 30, and snap holes 26. The number of snap holes 26 is determined by the amount necessary to attach debris shield 28 to upper guard (14 in FIGS. 1a-c). Fan shield 30 covers fan (32 in FIG. 1c)

to improve the wind tunnel effect and to prevent debris from entering fan (32 in FIG. 1c).

Although any clear, semi-rigid, flexible, translucent material can be used for debris shield 10, in the preferred embodiment, debris shield 28 is manufactured from polycarbonate. Any type of material can be used, as long as shield 10 is highly shatter resistant.

As can be seen in FIG. 3, blade shield 28 is angled at edge 40 upwards and away from the workpiece area. This is important for saws 12 which have guide 18 which is adjustable to allow blade 20 to cut at angles other than true vertical.

Debris shield 10 can be formed by molding or extruding. Snap holes 26 can be formed by drilling, extrusion, or molding, and the like. Holes 38 which receive snaps 22 may be formed in any manner such as drilling, bearing, or molding an upper guard prior to marketing.

Thus, although there have been described particular embodiments of the present invention of a new and useful "Debris Shield for a Hand Held Power Saw", it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A device for protecting a user of a hand held power saw from flying debris, said power saw having an upper guard having a curvature, a blade which creates wind during rotation, a motor, and a fan, said blade having a first side proximate said motor and a second side distally located from said motor said device comprising:
   a. a blade shield shaped to conform to said upper guard curvature extending laterally away from said upper guard, said blade shield for shielding said user and receiving said wind created by said blade, and directing said received wind from said blade laterally along said shield and forcing said debris away from said second side of said blade in a direction away from said motor;
   b. means for attaching said blade shield to said saw upper guard; and
   c. a fan shield directly attached to and extending laterally from said blade shield for directing wind from said fan of said motor across said blade and into said blade shield.

2. The device of claim 1 wherein said blade shield is made of polycarbonate.

3. The device of claim 1 wherein said means for attaching said blade shield to said upper guard comprises releasable snaps.

4. A device for shielding the user of a hand held power saw from debris, said hand held power saw having a fan for cooling said saw, a blade creating wind during rotation, and an upper guard with a plurality of holes, said device comprising:
   a. a blade shield having snap holes along a first edge in substantial alignment with said upper guard holes, said blade shield extending laterally away from said upper guard and from said first edge to a second edge, said blade shield receiving said wind and directing said wind and said debris in a direction from said first edge to said second edge;
   b. snaps received by said upper guard holes and said blade shield holes for attaching said blade shield to said upper guard such that said blade shield extends laterally from said upper guard; and
   c. a fan shield directly attached to said blade shield for directing an output from said fan across said blade and toward said second edge.

5. A device for shielding the user of a hand held power saw from debris, said hand held power saw having an upper guard having a curvature, a fan, and a rotating blade creating wind having a first side facing a motor and a second side opposite said first side, said device comprising:
   a. a blade shield extending laterally away from said upper guard to a distal edge for redirecting said wind from said second side toward said distal edge away from said blade and said saw, said blade shield attached to and conforming to said curvature of said guard, said blade shield directing said debris away from said motor and said blade;
   b. a fan shield directly attached to said blade shield to direct output from said fan toward said blade shield; and
   c. means for attaching said blade shield to said saw.

* * * * *